W. B. KIMBLE.
COMPOSITOR'S SCALE.
APPLICATION FILED AUG. 2, 1918.

1,363,126.

Patented Dec. 21, 1920.
2 SHEETS—SHEET 1.

Inventor;
William B. Kimble,
by his Attorneys
Howson & Howson

W. B. KIMBLE.
COMPOSITOR'S SCALE.
APPLICATION FILED AUG. 2, 1918.

1,363,126.

Patented Dec. 21, 1920.
2 SHEETS—SHEET 2.

Inventor,
William B. Kimble,
by his Attorneys
Howson & Howson

UNITED STATES PATENT OFFICE.

WILLIAM B. KIMBLE, OF CAMDEN, NEW JERSEY.

COMPOSITOR'S SCALE.

1,363,126.        Specification of Letters Patent.        Patented Dec. 21, 1920.

Application filed August 2, 1918. Serial No. 247,911.

*To all whom it may concern:*

Be it known that I, WILLIAM B. KIMBLE, a citizen of the United States, residing in Camden, New Jersey, have invented Compositors' Scales, of which the following is a specification.

One object of this invention is to provide an accurate and simple scale particularly adapted for the use of typographical compositors whereby it shall be possible to quickly and conveniently make the various measurements necessary in laying out, composing or imposing matter to be printed;— the invention contemplating not only a novel form of unit measure but also a novel device for permitting this to be conveniently used.

A further object of the invention is to provide a novel apparatus for conveniently and quickly laying out and making up typographical composition;—the arrangement of parts being such as to advantageously utilize the unit measure and scale forming part of my invention.

I also desire to provide a novel form of illuminated table and measuring scale especially adapted for use in typographical composition and of such construction that it will not only make possible the accurate and rapid measurement of the various dimensions necessary in such work but will also provide a surface upon which any desired figures or lay-out may be drawn in definite positions by using my scale.

These objects and other advantageous ends I attain as hereinafter set forth, reference being had to the accompanying drawings, in which, Figure 1 is a plan of the unit measure devised by me;

The unit measure devised by me consists of two connected straight lines 1 and 2 extending at right angles to each other and having a length of one pica, twelve times .0138 inches, from their outer intersecting edges to their outer or distant ends. The width of each of said lines is one-twelfth of this length or one point, so that the distance from the end of either line to the adjacent side of the other line is equal to eleven points. Each of said lines has projecting perpendicularly from its inner side a secondary line 3 having a height of two points and of as small a width as is possible, the distance of either of these latter lines from the outer edges of the main line 1 or 2 from which it projects being equal to six points.

Figure 2:
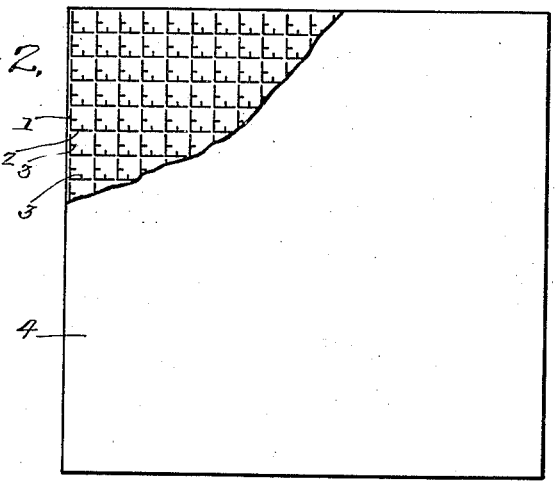
Fig. 2 is a plan of a card or plate showing a scale made up of my measuring units.

As will be understood by those skilled in the typographical art, a unit measure constructed as above will permit of the rapid reading of the accurate measurements required in type-setting, and if a thin transparent sheet of celluloid, glass or equivalent material be printed, etched, or otherwise provided with a series of the above unit measures as indicated, in Fig. 2, the application and convenient use of my invention is materially facilitated.

Figure 1:
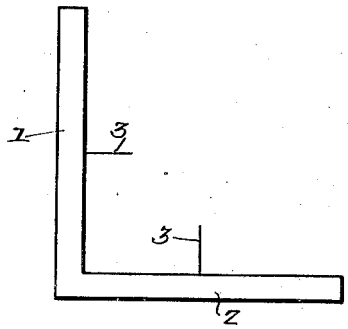

In so applying the unit measures of Fig. 1, I arrange them in a number of parallel series immediately adjacent each other, so that while the whole card or plate when viewed from a short distance, has the appearance of squared or cross-section paper, it differs from this in having the free or outer ends of each of the unit measures of which it is made up, separated a short distance from the outer edges of the unit measures above and to the right of it;—the distance from the bottom edge of one unit measure to the bottom edge of the unit measure either above or below it being equal to one pica or twelve points, as is also the distance from the outer vertical edge of the main line 1 of any unit measure to the similar edge of that unit measure on either side of it.

Figure 5:
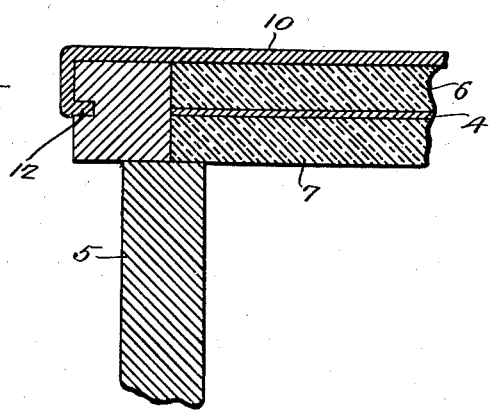
Fig. 5 is an enlarged vertical section illustrating the detail construction of the lay-out table.

In mounting the plate or sheet shown in Fig. 2 for use on a work or laying-out table, I provide a shallow casing or box 5 having a flat cover of frosted or etched glass 6 mounted with its roughened side uppermost, in order that it may be used as a surface on which sketches, lettering, etc., may be made with a pencil or other suitable means. In contact with the under surface of this top glass surface I mount the sheet or plate 4 on which is printed, engraved or etched the scale made up of the parallel sets of my unit measures shown in Fig. 1, this sheet being held flat against the frosted plate 6 by a transparent glass plate 7, the parts being preferably arranged as shown in Fig. 5. Within the box or casing 5 I mount any suitable source of light such as one or more incandescent lamps 8 provided with suitable reflectors 9 whereby the scale upon the sheet 4 will be rendered visible through the etched or frosted surface of the top glass plate 6.

With this arrangement of elements, the dimensions of cuts, bodies of printed matter, pictures, etc., may be readily and quickly determined by applying them to the top surface of the glass plate 6 which permits such dimensions or measurements to be read from the scale on the sheet 4 in terms of points or picas. It is also possible to outline or sketch on the frosted top surface of the glass plate 6 and to conveniently alter or erase such sketches as may be desirable.

Figure 3:
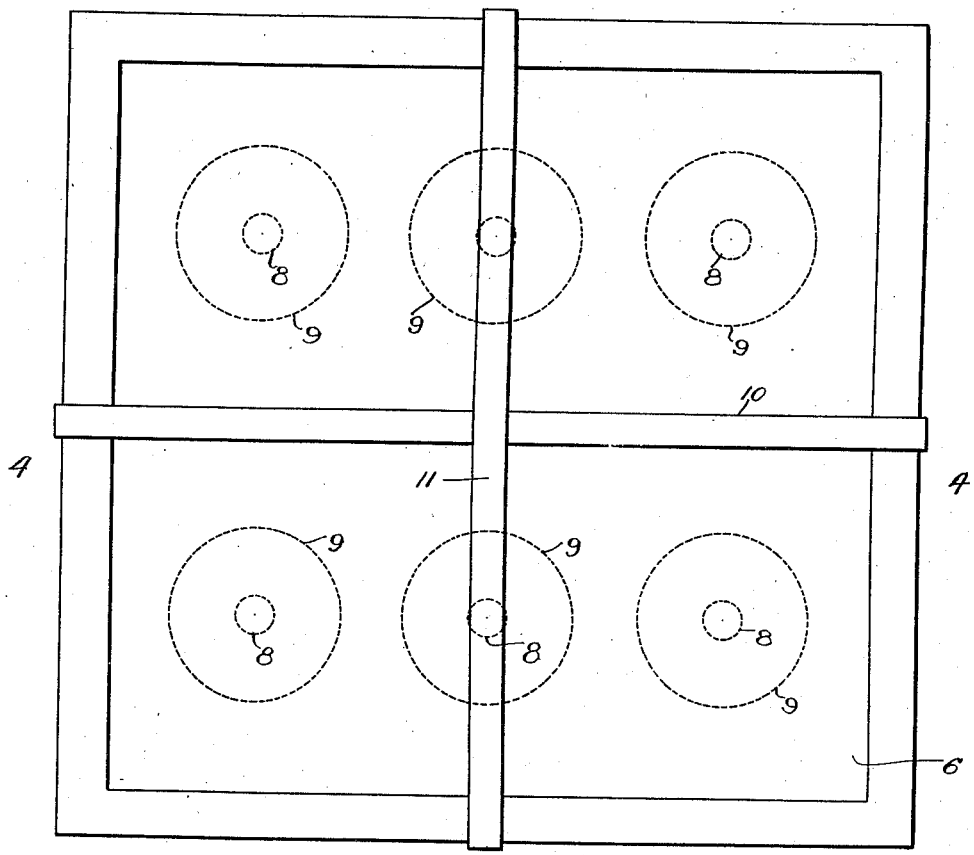
Fig. 3 is a plan of the lay-out table on which one form of my scale is preferably used.
Figure 4:
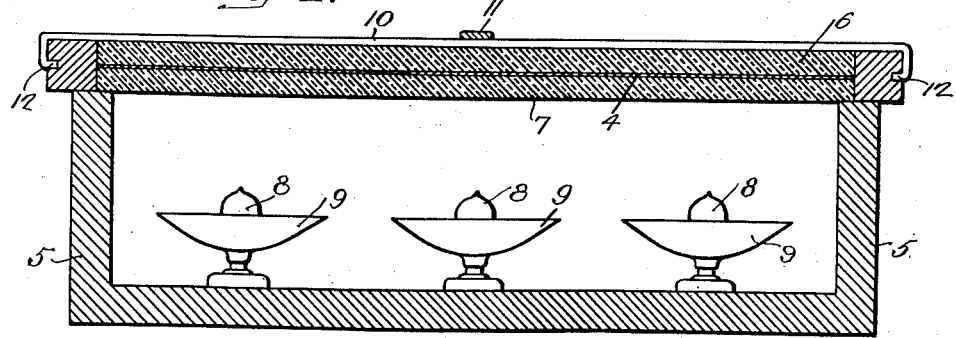
Fig. 4 is a transverse vertical section on the line 4—4, Fig. 3.

With the above description, it will be appreciated that the unit measure devised by me and illustrated in Fig. 1 is of such form or construction as to be capable of accurate and rapid use, particularly when employed in a scale formed of a series of one or any number of lines as shown in Fig. 2, for the determination or laying off of the spaces, dimensions, etc., required in type, composition or imposition work. Moreover, especially when mounted as shown in Figs. 3 to 5, so as to provide a sketching table, the scale lends itself with peculiar advantage to the artistic designing and economical laying out of advertising or other proposed printed matter.

If desired or found advisable I may provide the table (Figs. 3 to 5) with two sliding rules or straight edges 10 and 11 and these are preferably arranged to extend in lines at right angles to each other. Both of said rules are conveniently made of thin strip metal having their ends bent twice at a right angle so as to be slidably operative in notches or grooves in the sides of the top edges of the casing 5 as indicated at 12 and as shown, have sufficient width to insure that they shall move at all times at right angles to each other.

I claim:

1. A scale consisting of a sheet having thereon at least one line of similar characters, each consisting of two connected main portions extending at right angles and having a length of sustantially twelve points, the adjacent sides of said main portions having secondary portions two points in length extending at right angles to each other and each at a distance of six points from the outer end of its associated main portion.

2. The combination of a source of light, a sheet having a number of parallel series of similar characters thereon, each character consisting of two relatively broad lines at right angles to each other and respectively eleven and twelve points in length; with secondary lines two points long projecting from the inner sides of said main lines and each six points distant from the outer end of its associated broad line; with a plate of translucent material mounted with said sheet between it and the light source, the top surface of said plate being formed to receive and permit the erasure of a pencil record.

3. The combination of a sheet of frosted glass having its top surface etched; a sheet under said plate having thereon a number of unit measure characters each consisting of two main lines connected to define a right angle and having a length on their outer edges of one pica each; with secondary lines projecting from the inner sides of said main lines respectively at right angles thereto; and a source of light for rendering the characters of said sheet visible through the plate.

4. The combination of a box; a plate of frosted glass constituting a cover therefor; a plate of glass under said first plate; a sheet mounted between said plates and having on it a number of series of characters each consisting of two lines connected to define a right angle, the distance from the end of either line to the outer edge of the other line being one pica and the thickness of each line being one point; secondary lines projecting from the inner sides of each of said main lines and having a length of two points; with a source of light in said box for rendering the characters on said sheet visible through said frosted glass.

In witness whereof I affix my signature.

WM. B. KIMBLE.